(12) United States Patent
Klode

(10) Patent No.: US 10,787,247 B2
(45) Date of Patent: Sep. 29, 2020

(54) HYBRID ACTUATOR

(71) Applicant: GOODRICH CORPORATION, Charlotte, NC (US)

(72) Inventor: Harald Klode, Centerville, OH (US)

(73) Assignee: GOODRICH CORPORATION, Charlotte, NC (US)

(*) Notice: Subject to any disclaimer, the term of this patent is extended or adjusted under 35 U.S.C. 154(b) by 383 days.

(21) Appl. No.: 15/872,472

(22) Filed: Jan. 16, 2018

(65) Prior Publication Data

US 2019/0217945 A1    Jul. 18, 2019

(51) Int. Cl.

| | | |
|---|---|---|
| *F15B 15/14* | (2006.01) | |
| *B64C 25/18* | (2006.01) | |
| *B64C 25/22* | (2006.01) | |
| *B64C 25/24* | (2006.01) | |
| *F15B 15/18* | (2006.01) | |
| *B64C 25/26* | (2006.01) | |
| *B64C 25/20* | (2006.01) | |
| *B64C 25/34* | (2006.01) | |
| *F15B 1/26* | (2006.01) | |
| *B64C 13/50* | (2006.01) | |

(52) U.S. Cl.
CPC ............ *B64C 25/18* (2013.01); *B64C 25/20* (2013.01); *B64C 25/22* (2013.01); *B64C 25/24* (2013.01); *B64C 25/26* (2013.01); *B64C 25/34* (2013.01); *F15B 15/1447* (2013.01); *F15B 15/1457* (2013.01); *F15B 15/18* (2013.01); *B64C 13/504* (2018.01); *F15B 1/26* (2013.01); *F15B 15/1428* (2013.01); *F15B 2211/20515* (2013.01); *F15B 2211/20561* (2013.01); *F15B 2211/27* (2013.01)

(58) Field of Classification Search
CPC ..... F15B 15/18; F15B 15/1447; B64C 13/504
See application file for complete search history.

(56) References Cited

U.S. PATENT DOCUMENTS

| | | | | |
|---|---|---|---|---|
| 2,918,795 | A * | 12/1959 | Marien | .................. B64C 13/24 |
| | | | | 60/475 |
| 3,815,361 | A * | 6/1974 | Manini | .................. E05F 15/53 |
| | | | | 60/477 |
| 6,059,228 | A | 5/2000 | Koizumi et al. | |
| 8,789,791 | B2 * | 7/2014 | Matasso | ................ B64C 13/504 |
| | | | | 244/99.2 |
| 8,973,869 | B2 * | 3/2015 | Onomichi | ............... B64C 25/22 |
| | | | | 244/102 R |

(Continued)

FOREIGN PATENT DOCUMENTS

WO    2009153444    12/2009

OTHER PUBLICATIONS

European Patent Office, European Search Report dated May 14, 2019 in Application No. 19151468.6.

*Primary Examiner* — Brian M O'Hara
(74) *Attorney, Agent, or Firm* — Snell & Wilmer L.L.P.

(57) ABSTRACT

A hybrid actuator, having a central longitudinal axis, may include a housing defining a central cavity. The hybrid actuator may also include a piston disposed within the central cavity, the piston comprising a piston head that divides the central cavity into a pressure chamber and an annular chamber. The piston houses a pump configured to pump fluid through a port defined in the piston head between the annular chamber and the pressure chamber to extend a piston rod of the piston from the central cavity, according to various embodiments.

20 Claims, 6 Drawing Sheets

(56) References Cited

U.S. PATENT DOCUMENTS

| | | |
|---|---|---|
| 9,056,672 B2 | 6/2015 | Keller et al. |
| 9,057,390 B2 * | 6/2015 | Onishi ................... F15B 15/18 |
| 9,422,052 B2 | 8/2016 | Kondo et al. |
| 2003/0000765 A1 | 1/2003 | Spadafora |
| 2013/0105624 A1 | 5/2013 | Dubois |
| 2016/0061233 A1 | 3/2016 | Staab et al. |
| 2017/0002844 A1 | 1/2017 | Lesage et al. |
| 2019/0063472 A1 * | 2/2019 | Blanding ................. F04B 1/20 |

* cited by examiner

Section A-A

HYBRID ACTUATOR

FIELD

The present disclosure relates to linear actuators, and more specifically, to a hybrid hydraulic-electromechanical actuator.

BACKGROUND

Linear actuators are actuators that create motion along a straight axis. While there are many uses for linear actuators, aircraft often include one or more landing gear that are retractable that utilize a linear actuator to facilitate retraction and extension of the landing gear. Retractable aircraft landing gear may be typically stowed in the aircraft structure and are deployed during takeoff and landing events. Retractable landing gear may typically include a strut having an upper end pivotally mounted to the frame of the aircraft about a retraction axis for pivotal displacement between a vertical, downwardly extending, landing and ground support position, and a horizontal retracted position nested within a lower surface of the aircraft wing or fuselage.

SUMMARY

In various embodiments, the present disclosure provides a hybrid actuator. The hybrid actuator, having a central longitudinal axis, may include a housing defining a central cavity. The hybrid actuator may also include a piston disposed within the central cavity, the piston comprising a piston head that divides the central cavity into a pressure chamber and an annular chamber. The piston houses a pump configured to pump fluid through a port defined in the piston head between the annular chamber and the pressure chamber to extend a piston rod of the piston from the central cavity, according to various embodiments.

In various embodiments, the housing defines a bypass channel extending parallel to the central longitudinal axis between the pressure chamber and the annular chamber. The hybrid actuator may also include a bypass valve configured to control flow of fluid through the bypass channel. The bypass valve is normally open in a de-energized state to allow fluid to freely flow between the pressure chamber and the annular chamber, according to various embodiments. In an energized state, the bypass valve may be closed, thereby fluidly isolating the pressure chamber from the annular chamber except for via the port.

In various embodiments, the housing defines at least one fluid reservoir extending parallel to the central longitudinal axis, wherein the at least one fluid reservoir is fluidly open to the annular chamber. The piston may house an electric motor configured to drive the pump. The piston may also house a planetary gear assembly coupled between the electric motor and the pump. The pump may be a positive displacement pump, such as a dual-gear external gear pump. In various embodiments, the electric motor is electrically connected to a sealed connector mounted to the piston rod.

Also disclosed herein, according to various embodiments, is a landing gear comprising a strut and a hybrid actuator coupled to the strut. The hybrid actuator may include the features described above. In various embodiments, extension of the piston rod from the central cavity is configured to retract or stow the landing gear. In various embodiments, retraction of the piston rod into the central cavity is configured to extend or deploy the landing gear. In response to deactivating the pump, fluid may be configured to passively backflow through the port to generate electricity as the landing gear passively extends due to gravity. In various embodiments, the housing defines a bypass channel extending parallel to the central longitudinal axis between the pressure chamber and the annular chamber.

Also disclosed herein, according to various embodiments, is a method of operating a hybrid actuator. The method may include activating a pump housed within a piston disposed within a central cavity defined within a housing of the hybrid actuator. A piston head of the piston may divide the central cavity into a pressure chamber and an annular chamber, and the pump may be configured to pump fluid through a port defined in the piston head between the pressure chamber and the annular chamber to drive translation of the piston along a central longitudinal axis of the actuator housing. The method may also include closing a bypass valve for a bypass channel defined by the housing. In response to closing the bypass valve, fluid communication between the pressure chamber and the annular chamber is restricted to the port, according to various embodiments.

In various embodiments, the method further includes reversing the pump to drive translation of the piston in an opposite direction along the central longitudinal axis. In various embodiments, the method may include deactivating the pump and generating electricity by allowing passive backflow of fluid via the port. In various embodiments, the method includes deactivating the pump and opening the bypass valve to allow passive fluid communication between the pressure chamber and the annular chamber via the bypass channel to allow passive translation of the piston along the central longitudinal axis.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
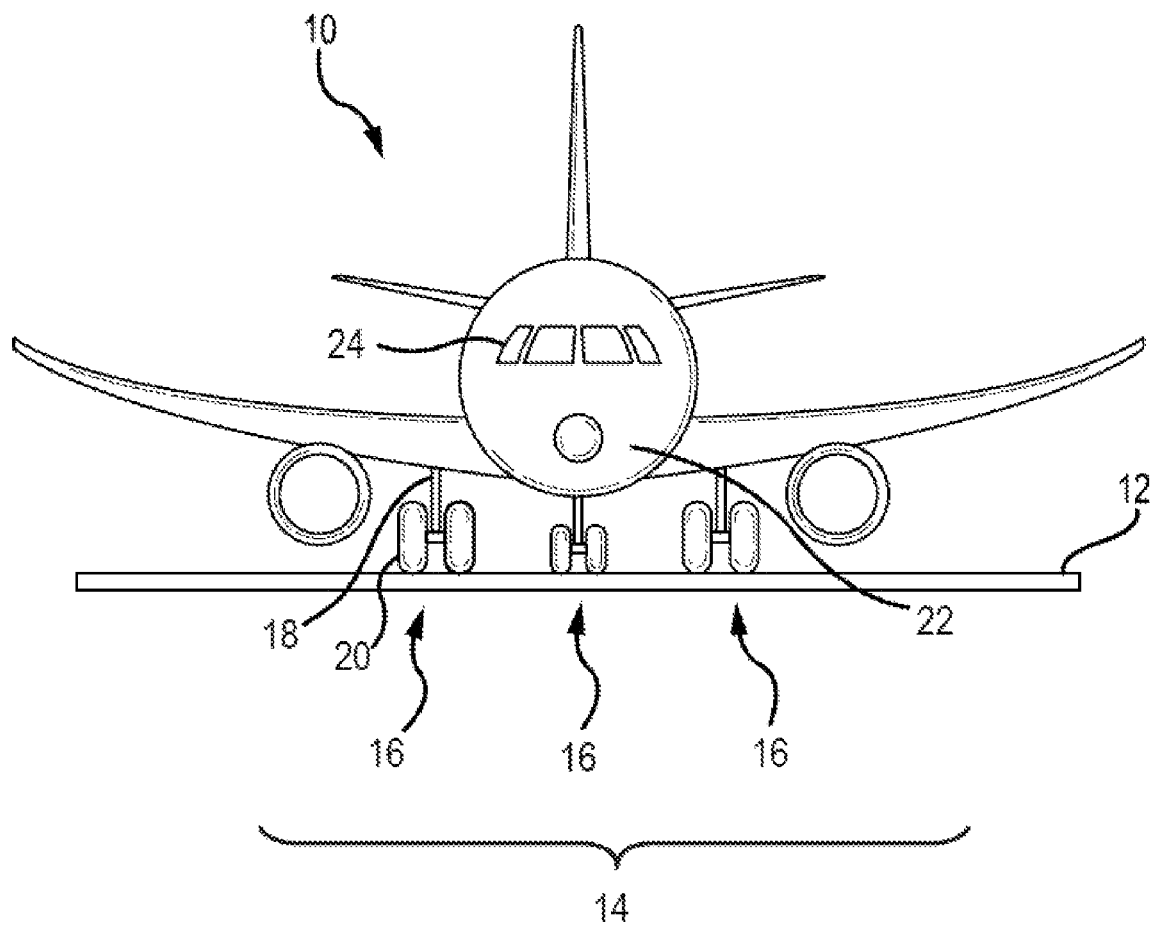
FIG. 1 illustrates an aircraft, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, is a linear hybrid actuator. The hybrid actuator, as described in greater detail below, generally includes hydraulic and electromechanical components to effectuate linear translation. That is, the hybrid actuator generally includes a pump housed within a piston for pumping a fluid within a central cavity defined by the hybrid actuator, with the fluid pumping action driving the linear translation of the piston. While numerous details are included herein pertaining to implementing a hybrid actuator in a landing gear assembly to facilitate extension and/or retraction of the landing gear, the scope of the present disclosure is not limited to landing gear assemblies.

With reference to FIG. 1, aircraft 10 on runway 12 is shown, in accordance with various embodiments. Aircraft 10 may include a landing gear system 14 comprising one or more landing gear 16, each coupled to one or more wheel and brake assemblies. Landing gear 16 may include a strut, shock strut, bogie beam, axle and/or other structure, coupled to one or more wheels of the landing gear 16. For example, each landing gear 16 may include a strut 18, which supports one or more wheels 20. In various embodiments, landing gear 16 may include deployable and/or retractable landing gear (e.g., as described in greater detail below with reference to FIG. 2). Aircraft 10 may include a controller 22 and pilot controls 24. Landing gear system 14 may be in communication with controller 22 and/or pilot controls 24 and may receive commands from controller 22 and/or pilot controls 24, for example, to deploy or to retract landing gear 16.

Figure 2:
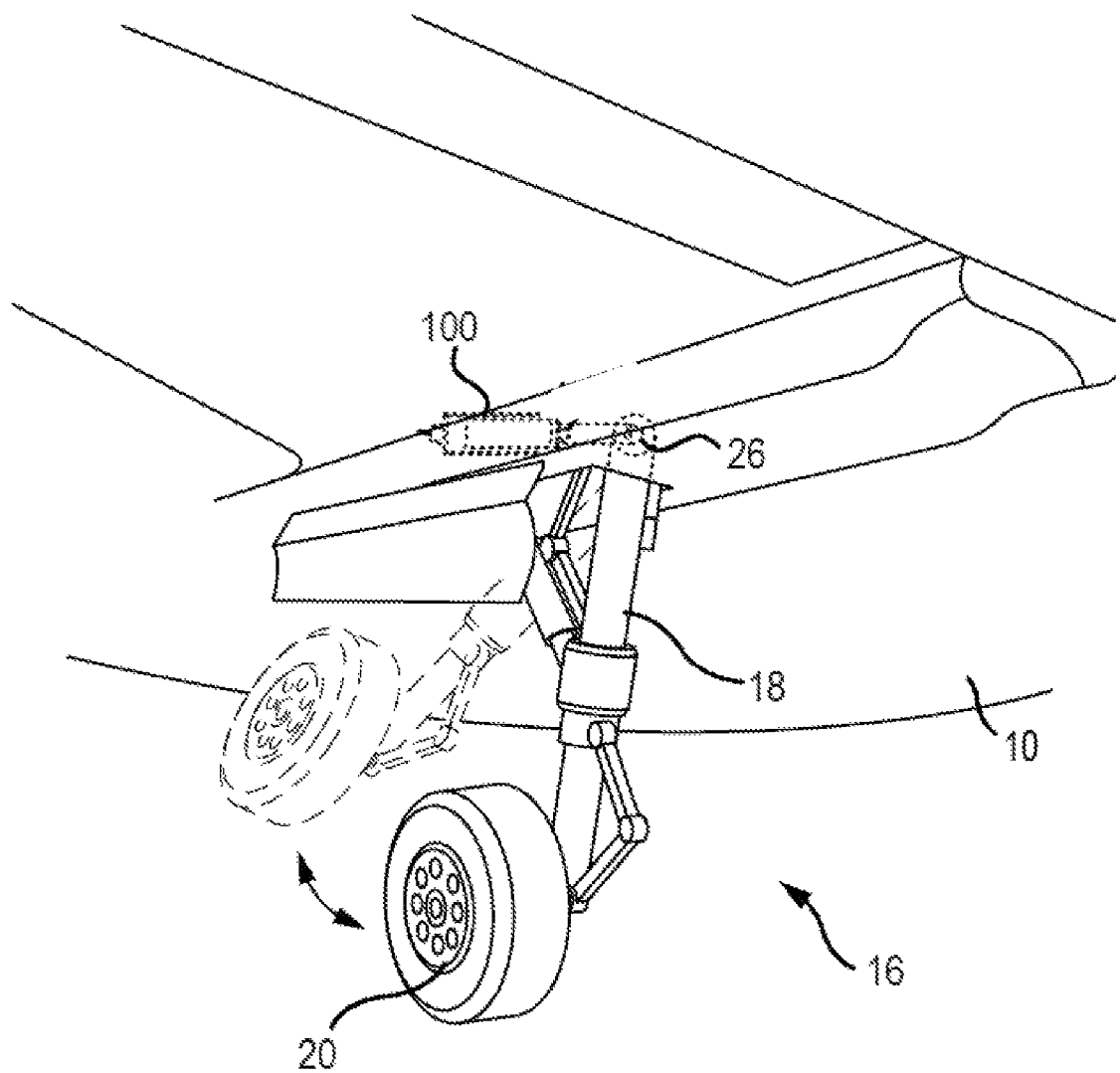
FIG. 2 illustrates a perspective view of retractable landing gear employed on an aircraft, in accordance with various embodiments.

With reference to FIG. 2, aircraft 10 having a retractable landing gear is shown, in accordance with various embodiments. A strut 18 of landing gear 16 may have an upper end pivotally mounted to the aircraft 10 at a pivot 26. Landing gear 16 may further comprise a hybrid actuator 100 operatively associated with the strut 18 and configured to drive the deployment and/or stowing of landing gear 16. Strut 18 may be rotatable about pivot 26 in response to the hybrid actuator 100 applying a force to an arm and/or joint of strut 18.

With continued reference to FIG. 2, hybrid actuator 100 may be configured to extend/retract to move landing gear 16 from a retracted position to a deployed position and from a deployed position to a retracted (stowed) position. In various embodiments, the hybrid actuator 100 may be configured to extend, causing landing gear 16 to rotate about pivot 26 into a position for stowage, i.e., a retracted position. Hybrid actuator 100 may be configured to retract causing landing gear 16 to rotate about pivot 26 into a deployed position. For purposes of illustration, hybrid actuator 100 will be discussed as extending to stow landing gear 16, and retracting to deploy landing gear 16. However, it will be understood from this disclosure that, in various embodiments, the hybrid actuator 100 may be configured to extend in order to deploy landing gear 16, and retract in order to stow landing gear 16.

Figure 3:
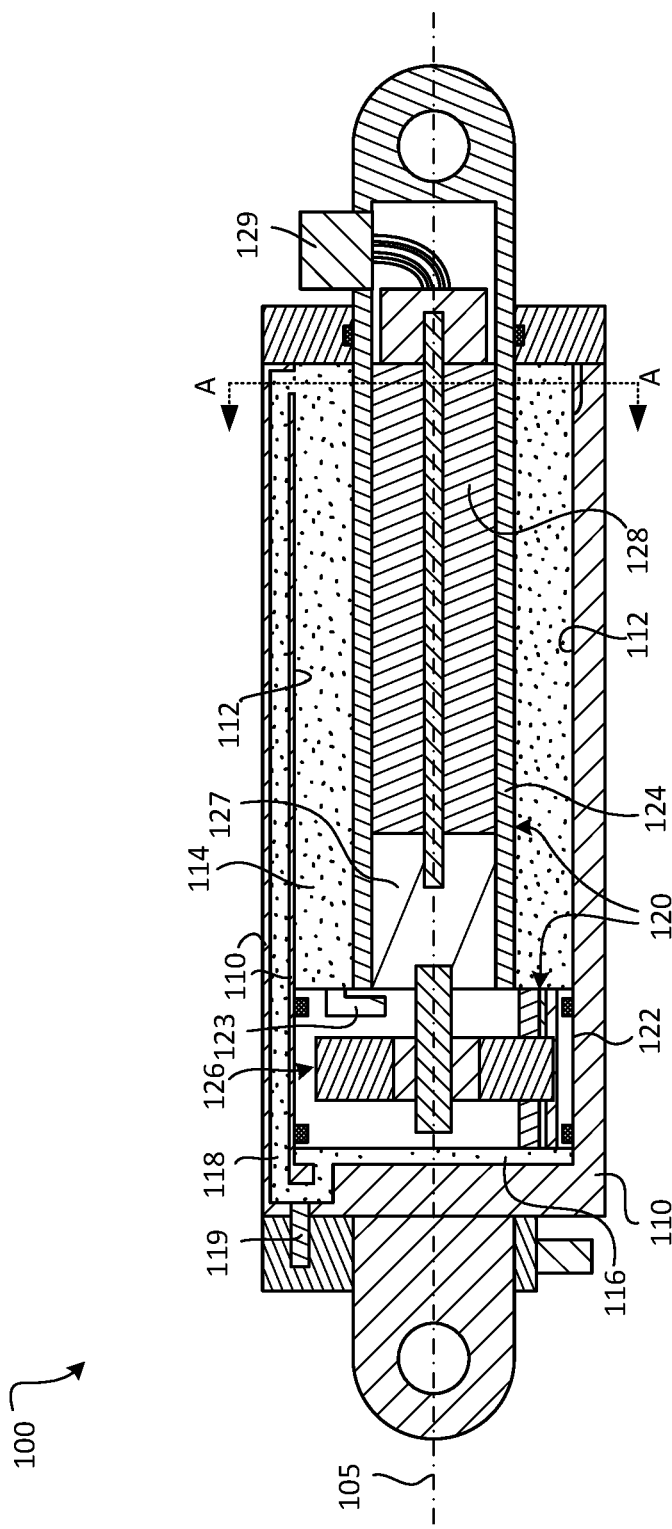
FIG. 3 illustrates a cross-sectional view of a hybrid actuator in a retracted configuration, in accordance with various embodiments.
Figure 4:
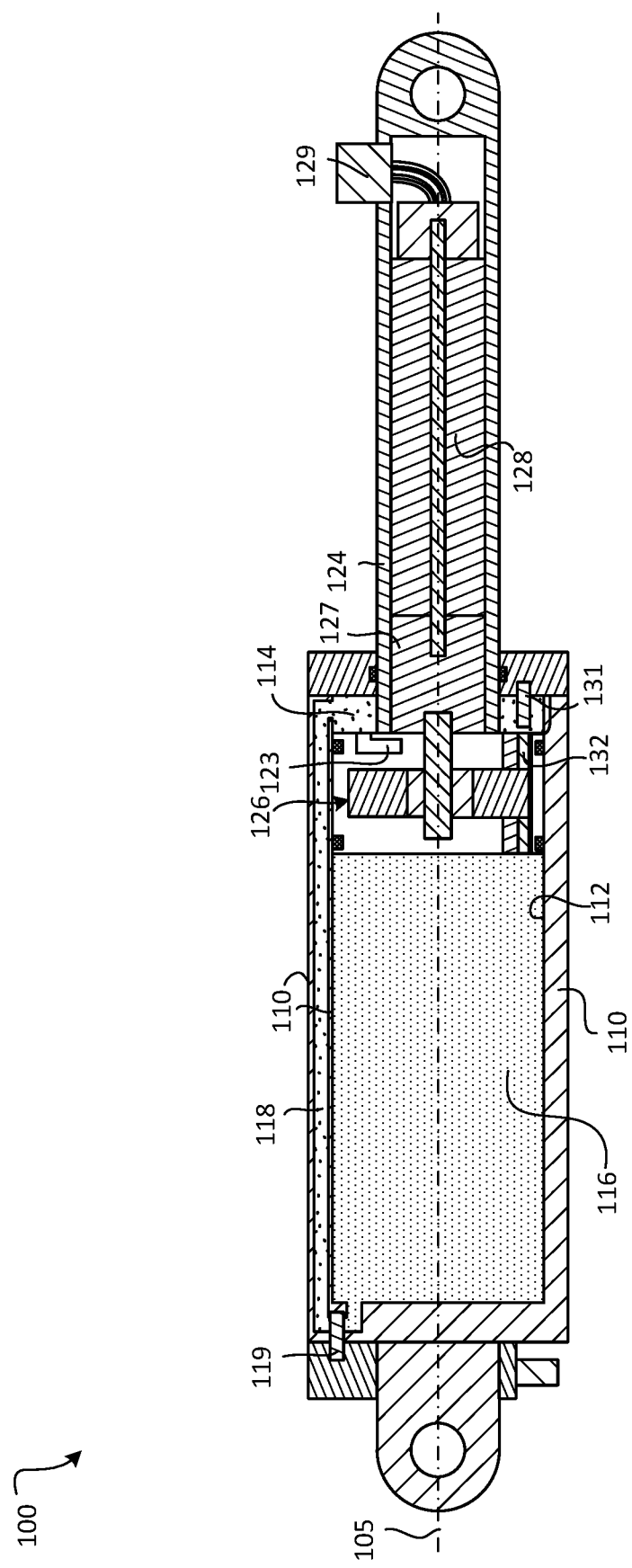
FIG. 4 illustrates a cross-sectional view of the hybrid actuator of FIG. 3 but in an extended configuration, in accordance with various embodiments.

In various embodiments, and with reference to FIGS. 3 and 4, the hybrid actuator 100 has a central longitudinal axis 105 and includes a housing 110 that defines a central cavity 112. The hybrid actuator 100 also includes, according to various embodiments, a piston 120 disposed within the central cavity 112. The piston 120 may include a piston head 122 and a piston rod 124. The piston head 122, according to various embodiments, divides the central cavity 112 into a pressure chamber 116 and an annular chamber 114. The piston 120 is generally configured to translate through the central cavity 112 while maintaining a fluid seal between the divided chambers 114, 116 of the central cavity 112. That is, the piston head 122 may have a radially outward surface that complementarily engages a radially inward surface of the housing 110 that defines the central cavity 112 to facilitate a fluid seal. In various embodiments, the radially outward surface of the piston head 122 may include sealing features, such as gaskets or "O-rings" that maintain fluid separation between the pressure chamber 116 and the annular chamber 114 as the piston 120 moves within the central cavity 112.

In various embodiments, piston 120 houses a pump 126 that is configured to pump fluid through a port 123 defined in the piston head 122 between the annular chamber 114 and the pressure chamber 116. The pumping of fluid between chambers 114, 116 drives translation of the piston 120, as described in greater detail below. In various embodiments, the piston 120 may also house an electric motor 128 to drive the pump 126. Further, the piston 120 may house a planetary gear assembly 127 coupled between the electric motor 128 and the pump 126. The electric motor 128 may be a brushless DC motor, and/or the pump may be a positive displacement pump, such as a dual-gear external gear pump. Accordingly, the pump, the motor, and the gearing may all be housed within the piston 120, which itself is moveably positioned within the central cavity 112 of the housing 110 of the actuator 100, making for a compact actuator. In various embodiments, the electric motor is electrically connected to a sealed connector 129 mounted to the piston rod 124.

In various embodiments, and with reference to FIGS. 2, 3, and 4, the housing 110 of the hybrid actuator 100 defines a bypass channel 118 extending between the pressure chamber 116 and the annular chamber 114. That is, the bypass channel 118 fluidly interconnects the pressure chamber 116 and the annular chamber 114. In various embodiments, the bypass channel 118 is substantially parallel to the central longitudinal axis 105, and the locations of the openings where the bypass channel 118 opens to the central cavity 112 are at substantially opposite axial ends of the central cavity 112, thereby enabling fluid communication through the bypass channel 118 regardless of the position of the translatable piston 120 within the central cavity 112. In various embodiments, the hybrid actuator 100 also includes a bypass valve 119 configured to control flow of fluid through the bypass channel 118. The bypass valve 119 may switch between open and closed, or the position of the bypass valve 119 may be incrementally adjustable to provide at least a degree of fluid flow modulation through the bypass channel 118.

The bypass valve 119 may be a fail-open valve (i.e., a valve that is open in a de-energized state), thereby allowing fluid to flow freely between the pressure chamber 116 and the annular chamber 114 in the absence of power. As mentioned above, the hybrid actuator 100 may be utilized in conjunction with a landing gear 16, and the hybrid actuator 100 may be more specifically configured to retract the piston 120 to deploy the landing gear 16 and extend the piston 120 to retract/stow the landing gear 16. Accordingly, as mentioned above, the hybrid actuator 100 may be coupled to a strut 18 of a landing gear 16, and the landing gear 16 may passively (by gravity) deploy in the absence of power to the hybrid actuator 100 because the bypass valve 119 is open, thereby allowing the fluid to pass between the pressure chamber 116 and the annular chamber 114. To extend the piston 120, and thereby retract the landing gear again, the bypass valve 119 may be powered (e.g., switched to an energized state) and closed, thereby limiting and/or restricting fluidic communication between the pressure chamber 116 and the annular chamber 114 to the port 123 defined in the piston head 122 of the piston 120.

Figure 5:
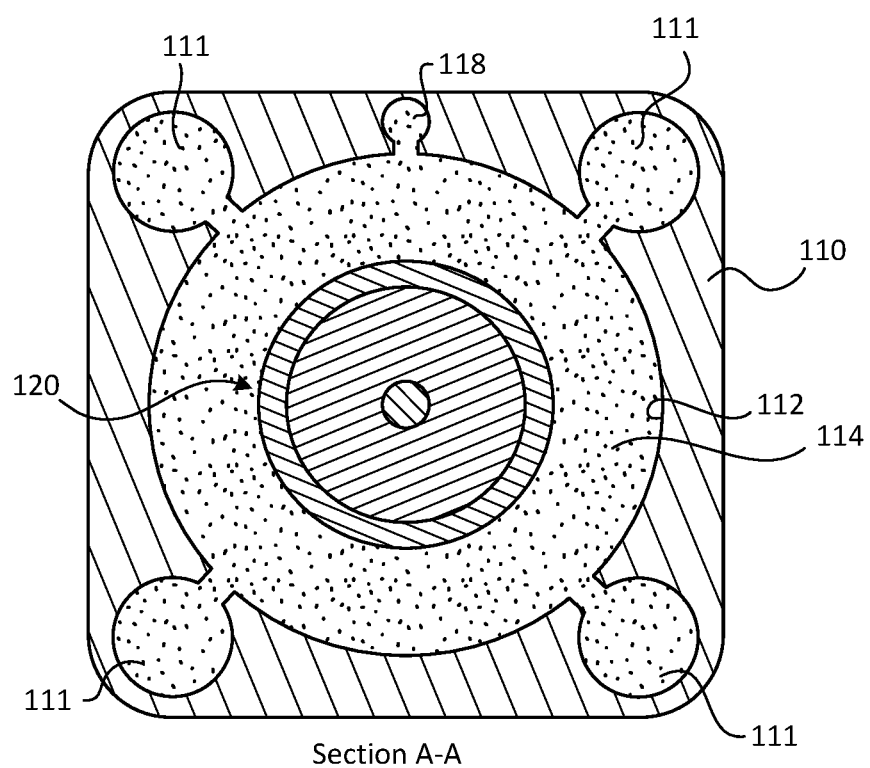
FIG. 5 illustrates a view of section A-A, identified in FIG. 3, of the hybrid actuator of FIG. 3, in accordance with various embodiments.

In response to activation/actuation of the pump 126, fluid from the annular chamber 114 may be pumped through the port 123 and into the pressure chamber 116. This pumping action increases the hydraulic pressure in the pressure chamber 116, thereby causing the piston 120 to translate axially to extend the piston 120 (as shown in FIG. 4, with the piston in the extended position). In various embodiments, one or more fluid reservoirs 111 may also be defined in the housing 110 of the hybrid actuator 100, as specifically shown in FIG. 5. As is evident in the transition from the retracted state shown in FIG. 3 and the extended state shown in FIG. 4, by moving the piston at least partially out from the confines of the housing 110, more volume is available within the central cavity 112 for fluid, and the fluid reservoirs 111 provide the surplus fluid needed to fill the increased volume. In various embodiments, the at least one fluid reservoir 111 extends parallel to the central longitudinal axis 105 and is also fluidly open to only the annular chamber 114. Thus, as the pump pumps fluid from the annular chamber 114 into the pressure chamber 116, more fluid is drawn through the annular chamber from the one or more fluid reservoirs 111.

Figure 6:
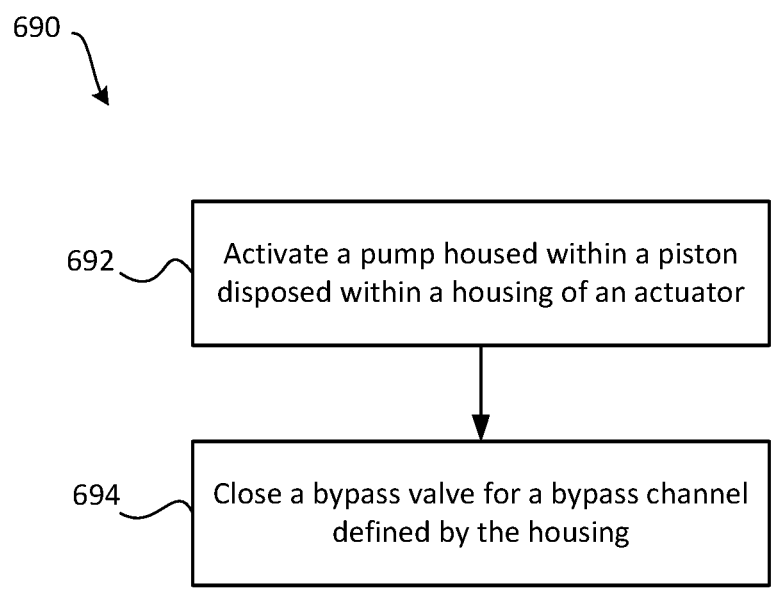
FIG. 6 is a schematic flow chart diagram of a method of operating a hybrid actuator, in accordance with various embodiments.

In various embodiments, and with reference to FIG. 6, a method 690 of operating a hybrid actuator 100 is provided. The method 690 may include activating the pump 126 housed within the piston 120 that is disposed within the housing 110 (e.g., the central cavity 112) of the hybrid actuator 100 at step 692. The method 690 may further include closing the bypass valve 119 of the bypass channel 118 at step 694. In response to the pump 126 being activated and the bypass valve 119 being in the closed position, the pump pressurizes the pressure chamber 116, thereby causing a corresponding translation of the piston 120 to extend the piston 120. Once the piston 120 has reached the desired extension, the position of the piston may be locked, either via mechanical fasteners/locks or by controlling (e.g., locking) the pump and motor such that any fluid flow between the two chambers 114, 116 is prevented.

To retract the piston, the direction of the pump 126 may be reversed, causing fluid to flow back from the pressure chamber 116, through the port 123, and into the annular chamber 114 and/or fluid reservoirs 111. This is an example of a controlled retraction, in which the speed and force of the retraction is controlled. In various embodiments, the piston 120 may be retracted passively (instead of actively). In various embodiments, the passive retraction of the piston 120 may occur via fluid flow through the port 123, and such backflow may cause the motor to operate as a generator as the compression of the piston, caused by gravity deployment of the landing gear, drives fluid from the pressure chamber 116, through the port 123, and into the annular chamber 114 and/or fluid reservoirs 111. Another way to passively retract the piston 120 is to open the bypass valve 119 (e.g., the valve may be de-energized), thereby allowing the pressure gradient between the pressure chamber 116 and the annular chamber 114 to equalize by back-flowing through bypass channel 118.

In various embodiments, the passive retraction of the piston 120 may provide a degree of damping, and/or may facilitate a smooth deployment of landing gear instead of a sudden and abrupt free-fall. As mentioned above, the bypass valve 119, or some other valve, may be utilized to change a dimension of an orifice in the bypass channel, thus modulating the passive backflow of fluid through the bypass channel 118. In various embodiments, the hybrid actuator 100 may include an end-of-travel stop 131 that is configured to engage and an end-of-travel valve 132 to prevent excessive pressurization of the pressure chamber 116 and/or to prevent damaging the pump and motor.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Also, any reference to attached, fixed, connected, coupled or the like may include permanent (e.g., integral), removable, temporary, partial, full, and/or any other possible attachment option. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A hybrid actuator comprising:
    a housing having a central longitudinal axis and defining a central cavity and a bypass channel extending parallel to the central longitudinal axis;
    a piston disposed within the central cavity, the piston comprising a piston head that divides the central cavity into a pressure chamber and an annular chamber, wherein the piston houses a pump configured to pump fluid through a port defined in the piston head between the annular chamber and the pressure chamber to extend a piston rod of the piston from the central cavity; and
    a bypass valve configured to control flow of the fluid through the bypass channel between the pressure chamber and the annular chamber, wherein the bypass valve is a flow control valve that is configured to be incrementally adjusted to change a dimension of an orifice in the bypass channel to incrementally adjust fluid flow through the bypass channel.

2. The hybrid actuator of claim 1, wherein the bypass valve is disposed within the housing.

3. The hybrid actuator of claim 2, wherein the bypass valve is not a check valve but is a flow control modulating valve.

4. The hybrid actuator of claim 1, wherein the bypass valve is open in a de-energized state to allow the fluid to freely flow between the pressure chamber and the annular chamber.

5. The hybrid actuator of claim 1, wherein in an energized state the bypass valve is closed, thereby fluidly isolating the pressure chamber from the annular chamber except for via the port.

6. The hybrid actuator of claim 1, wherein the housing defines at least one fluid reservoir extending parallel to the central longitudinal axis, wherein the at least one fluid reservoir is fluidly open to the annular chamber.

7. The hybrid actuator of claim 1, wherein the piston rod houses an electric motor configured to drive the pump.

8. The hybrid actuator of claim 7, wherein the electric motor housed within the piston rod is configured to operate as a generator in response to passive fluid flow from the pressure chamber through the port and into the annular chamber.

9. The hybrid actuator of claim 1, further comprising an end-of-travel stop and an end-of-travel valve, wherein the end-of-travel stop is configured to engage the end-of-travel valve to prevent excessive pressurization of the pressure chamber.

10. The hybrid actuator of claim 9, wherein the end-of-travel stop is disposed in the annular chamber and the end-of-travel valve is disposed in the piston head.

11. The hybrid actuator of claim 10, wherein the end-of-travel valve enables flow of the fluid from the pump back to the annular chamber.

12. A landing gear comprising:
    a strut; and
    a hybrid actuator coupled to the strut, the hybrid actuator comprising:
        a housing having a central longitudinal axis and defining a central cavity and a bypass channel extending parallel to the central longitudinal axis;
        a piston disposed within the central cavity, the piston comprising a piston head that divides the central cavity into a pressure chamber and an annular chamber, wherein the piston houses a pump configured to pump fluid through a port defined in the piston head between the annular chamber and the pressure chamber to extend a piston rod of the piston from the central cavity; and
        a bypass valve configured to control flow of the fluid through the bypass channel between the pressure chamber and the annular chamber, wherein the bypass valve is configured to be incrementally adjusted to change a dimension of an orifice in the bypass channel to incrementally adjust fluid flow through the bypass channel, wherein the bypass valve is disposed within the housing.

13. The landing gear of claim 12, wherein extension of the piston rod from the central cavity is configured to retract the landing gear.

14. The landing gear of claim 13, wherein retraction of the piston rod into the central cavity is configured to extend the landing gear.

15. The landing gear of claim 14, wherein in response to deactivating the pump, the fluid is configured to passively backflow through the port to generate electricity as the landing gear passively extends due to gravity.

16. The landing gear of claim 12, wherein the housing defines a bypass channel extending parallel to the central longitudinal axis between the pressure chamber and the annular chamber.

17. A method of operating a hybrid actuator, the method comprising:
    activating a pump housed within a piston disposed within a central cavity defined within a housing of the hybrid actuator, wherein a piston head of the piston divides the central cavity into a pressure chamber and an annular chamber, wherein the pump pumps fluid through a port defined in the piston head between the pressure chamber and the annular chamber to drive translation of the piston along a central longitudinal axis of the housing; and
    closing a bypass valve for a bypass channel defined by the housing, wherein the bypass valve is disposed within the housing, wherein in response to closing the bypass valve, fluid communication between the pressure chamber and the annular chamber is restricted to the port.

18. The method of claim 17, further comprising reversing the pump to drive translation of the piston in an opposite direction along the central longitudinal axis.

19. The method of claim 17, further comprising
deactivating the pump; and
generating electricity via an electric motor disposed in the piston rod by allowing passive backflow of the fluid via the port.

20. The method of claim 17, further comprising:
deactivating the pump; and
incrementally opening the bypass valve to modulate passive fluid communication between the pressure chamber and the annular chamber via the bypass channel to control passive translation of the piston along the central longitudinal axis.

* * * * *